US012800765B2

(12) United States Patent
Mayer et al.

(10) Patent No.: US 12,800,765 B2
(45) Date of Patent: Nov. 17, 2026

(54) AIRCRAFT SYSTEM CONFIGURED TO AUGMENT LIDAR-BASED AIRCRAFT AIR DATA MEASUREMENTS

(71) Applicant: The Boeing Company, Arlington, VA (US)

(72) Inventors: Robert Justin Mayer, Media, PA (US); Christopher Heyrman, St. Charles, MO (US); Robert Michael Dowgwillo, St. Louis, MO (US)

(73) Assignee: THE BOEING COMPANY, Arlington, VA (US)

(*) Notice: Subject to any disclaimer, the term of this patent is extended or adjusted under 35 U.S.C. 154(b) by 106 days.

(21) Appl. No.: 18/805,814

(22) Filed: Aug. 15, 2024

(65) Prior Publication Data

US 2026/0050084 A1 Feb. 19, 2026

(51) Int. Cl.
*G01S 17/86* (2020.01)
*B64D 43/02* (2006.01)

(52) U.S. Cl.
CPC .............. *G01S 17/86* (2020.01); *B64D 43/02* (2013.01)

(58) Field of Classification Search
None
See application file for complete search history.

(56) References Cited

U.S. PATENT DOCUMENTS

| | | | | |
|---|---|---|---|---|
| 5,000,566 | A | 3/1991 | Kuppenheimer, Jr. et al. | |
| 7,495,774 | B2 | 2/2009 | Hays et al. | |
| 8,527,233 | B2 | 9/2013 | McIntyre | |
| 10,228,691 | B1 * | 3/2019 | Pounds | G01S 13/88 |
| 10,444,367 | B2 | 10/2019 | Lodden et al. | |
| 2012/0078540 | A1 | 3/2012 | McIntyre | |
| 2016/0305977 | A1 | 10/2016 | Genevrier et al. | |
| 2017/0248700 | A1 * | 8/2017 | Lodden | G01P 21/025 |
| 2017/0276790 | A1 * | 9/2017 | Lodden | G01S 17/86 |
| 2018/0172720 | A1 * | 6/2018 | Miller | B64D 43/02 |
| 2019/0217966 | A1 * | 7/2019 | Winter | B64D 43/02 |
| 2026/0008560 | A1 * | 1/2026 | Vinci | B64D 43/02 |

FOREIGN PATENT DOCUMENTS

| | | | |
|---|---|---|---|
| CN | 110927744 | A | 3/2020 |
| CN | 117367493 | A | 1/2024 |

OTHER PUBLICATIONS

Federal Aviation Administration, "Airworthiness Standards: Transport Category Airplanes", GPO, 14 CFR Ch. 1 (Jan. 2, 2023 Edition), pp. 1-277, Dec. 24, 1964.

(Continued)

*Primary Examiner* — Peter D Nolan
*Assistant Examiner* — Michael F Whalen
(74) *Attorney, Agent, or Firm* — COATS & BENNETT, PLLC

(57) ABSTRACT

An aircraft system having a LIDAR system, one or more sensors, and a control unit. The control unit includes processing circuitry configured to calculate during flight a pressure altitude, calibrated airspeed, Mach number, equivalent airspeed, static temperature, static pressure, and dynamic pressure of an aircraft based on a combination of air data measurements from the LIDAR system and the one or more sensors.

20 Claims, 7 Drawing Sheets

(56) References Cited

OTHER PUBLICATIONS

Gracey, W., "Measurement of Aircraft Speed and Altitude", NASA Reference Publication 1046, Scientific and Technical Information Office, pp. 1-316, May 1, 1980.
International Organization for Standardization, "Standard Atmosphere (identical with the ICAO and WMO Standard Atmospheres from -2 to 32km)", May 15, 1975, pp. 1-15, First edition.
EP Search Report dated Dec. 16, 2025 in re EP Application No. 25184437.9.

* cited by examiner

AIRCRAFT SYSTEM CONFIGURED TO AUGMENT LIDAR-BASED AIRCRAFT AIR DATA MEASUREMENTS

TECHNOLOGICAL FIELD

The present disclosure relates generally to the field of determining air data measurements of an aircraft during flight and, more specifically, to using LIDAR data in combination with inputs from other sensors to determine air data measurements.

BACKGROUND

LIDAR (Light Detection And Ranging) systems are currently being investigated for measuring air data for aircraft use. The LIDAR systems are in various prototype phases from various vendors. The LIDAR systems use one or more lasers that emit light into the atmosphere to probe the atmosphere. The LIDAR systems receive returned light which is used to determine one or more air data measurements. The air data measurements are physical characteristics of a flow field in which the aircraft is immersed.

The LIDAR systems fundamentally rely on the scattering of light. Some LIDAR systems are based on Rayleigh scattering in which the laser light is elastically scattered from molecules in the atmosphere. The LIDAR systems measure the Doppler shift between the laser beams and the air molecules in the air mass to measure true airspeed. These Rayleigh scattering systems also use the spectral shape of the scattered light to measure temperature and pressure and/or density. However, with the current state-of-the-art, the accuracy of the pressure, and therefore the computed pressure altitude and the calibrated airspeed are subject to large uncertainties that render the measurements unreliable.

Other LIDAR systems are based on Mie scattering in which laser light is scattered from particles in the atmosphere. These systems use the Doppler shift between the laser beams and airborne particulate to measure the relative airspeed between the air mass and the aircraft. However, while the Mie scattering systems can be used to measure true airspeed, they are not capable of sensing or determining temperature or pressure, and hence pressure altitude or calibrated airspeed.

Due to various limitations, current LIDAR systems are unable to provide suitably accurate measurements to replace existing traditional pitot-static air data systems. The accuracy of current LIDAR systems is orders of magnitude worse than typical governmental certification requirements. In one example, FAR 25.1323 requires the measurement of pressure altitude with accuracies down to +/−30 feet. Typical LIDAR systems are not able to estimate the static pressure needed to compute the pressure altitude to this accuracy.

Most aircraft include traditional pitot-static systems to determine air data measurements. These traditional systems require that the sensor probes be located at carefully chosen places on the fuselage to minimize static pressure source errors over a wide range of flight conditions. Further, traditional systems require extensive aerodynamic modeling, wind tunnel testing, and/or flight testing to quantify the static source error correction. Traditional systems can also include flush static ports on the exterior of the aircraft. Such ports require special attention to aerodynamic disturbances caused by imperfections in the local shape of the surface, like waviness.

SUMMARY

One aspect is directed to an aircraft system comprising a LIDAR system, one or more sensors, and a control unit comprising processing circuitry configured to calculate during flight air data parameters comprising one or more of pressure altitude, calibrated airspeed, equivalent airspeed, Mach number, static temperature, static pressure, and dynamic pressure based on a combination of air data measurements from the LIDAR system and the one or more sensors.

In another aspect, the one or more sensors are configured to detect a total temperature and a total pressure during the flight.

In another aspect, the control unit is further configured to calculate an angle of sideslip of the aircraft, an angle of attack of the aircraft, and a true airspeed of the aircraft based on the air data measurements from the LIDAR system.

In another aspect, the control unit is further configured to cause one or more of the air data parameters to be displayed on a display onboard the aircraft.

In another aspect, the one or more sensors comprise a first sensor configured to detect a total pressure and a second sensor configured to detect a total temperature wherein the first sensor and the second sensor are independent.

In another aspect, the control unit is incorporated within a flight control system configured to control an operation of the aircraft during the flight.

In another aspect, the LIDAR system includes a laser that emits laser light and the one or more sensors comprise static pressure ports on an exterior surface of the aircraft and wherein the laser and the ports are spaced apart on the exterior of the aircraft.

In another aspect, the control unit is configured to determine the pressure altitude and the calibrated airspeed at regular intervals during the flight.

In another aspect, the LIDAR system and the one or more sensors are configured to simultaneously detect the air data measurements during the flight.

In another aspect, each of the one or more sensors, the LIDAR system, and the control unit are onboard the aircraft.

In another aspect, the control unit is remote from the aircraft and configured to receive the air data measurements from the aircraft during the flight.

One aspect is directed to a non-transitory computer readable medium comprising instructions stored thereon that, when executed by processing circuitry of a control unit, configures the control unit to: receive a total pressure of an aircraft during a flight; receive a total temperature of an aircraft during the flight; receive air data measurements from a LIDAR system during the flight; and determine one or more of static temperature, static pressure, pressure altitude, calibrated airspeed, Mach number, dynamic pressure, and equivalent airspeed of the aircraft based on the total pressure, the total temperature, and the air data measurements.

In another aspect, the control unit is further configured to cause the pressure altitude and the calibrated airspeed to be displayed on a display onboard the aircraft.

In another aspect, the control unit is configured to receive the total pressure from a first sensor and the total temperature from a second sensor.

In another aspect, the control unit is further configured to wherein the control unit is configured to display one or more of the static temperature, static pressure, pressure altitude, calibrated airspeed, Mach number, dynamic pressure, and equivalent airspeed on a display in the aircraft.

In another aspect, the control unit is configured to determine an angle of sideslip, an angle of attack, and a true airspeed based on the air data measurements from the LIDAR system.

In another aspect, the control unit is configured to determine a true airspeed of the aircraft based on just the air data measurements from the LIDAR system and not the total pressure or the total temperature.

One aspect is directed to a method of determining air data parameters during a flight of an aircraft. The method comprises: determining a true airspeed of the aircraft based on first inputs from a first input device; determining a total air temperature based on second inputs from a second input device; determining a total pressure based on third inputs from a third input device; and deriving static temperature, static pressure, pressure altitude, calibrated airspeed, Mach number, and equivalent airspeed based on the true airspeed, the total air temperature, and the total pressure.

In another aspect, determining the total air temperature comprises receiving the total air temperature from a first sensor on the aircraft and determining the total pressure comprises receiving the total pressure from a second sensor on the aircraft.

In another aspect, the method further comprises displaying one or more of the Mach number, static temperature, pressure altitude, static pressure, equivalent airspeed, dynamic pressure, and calibrated airspeed on a display within the aircraft.

The features, functions and advantages that have been discussed can be achieved independently in various aspects or may be combined in yet other aspects, further details of which can be seen with reference to the following description and the drawings.

DETAILED DESCRIPTION

Figure 1:
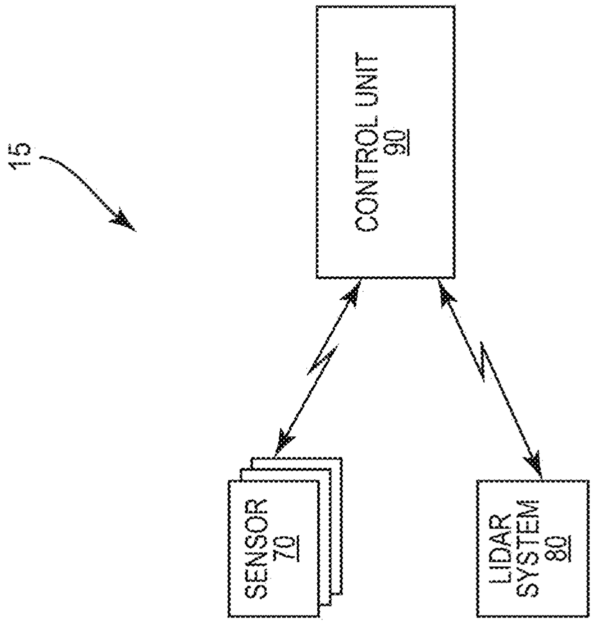
FIG. 1 is a schematic diagram of an aircraft system configured to determine air data parameters based on air data measurements from sensors and a LIDAR system.

FIG. 1 illustrates an aircraft system 15 for use with an aircraft. The aircraft system 15 includes one or more sensors 70 configured to take air data measurements during flight. The air data measurements include a total pressure and a total temperature of the aircraft 100. A LIDAR system 80 is configured to detect scattered light to determine one or more of true airspeed, temperature, pressure, and density. A control unit 90 uses the data from the sensors 70 to supplement the data from the LIDAR system 80 to determine one or more air data measurements. In some examples, the LIDAR data is supplemented with the sensor data to determine one or more of pressure altitude, calibrated airspeed, Mach number, equivalent airspeed, static temperature, static pressure, and dynamic pressure. Because of the high-quality of results, the aircraft system 15 can replace traditional air data systems.

The aircraft system 15 uses data from the independent sensors 70 to augment the LIDAR measurements to determine highly-accurate air data measurements that requires minimal a priori flight testing. Static pressure measurements are highly dependent on the configuration of the aircraft, location of the sensor, and flight conditions. Static temperature is impractical to measure directly in flight with a physical sensor except at very low speeds. Conversely, total temperature and total pressure measurements are both practical and robust, being largely independent of placement or flight conditions within a reasonable angle of attack and sideslip range. This enables the air data measurements of the aircraft system 15 to be used early in flight test programs without the need to conduct extensive calibrations. Further, the aircraft system 15 can be used on multiple aircraft types.

Figure 2:
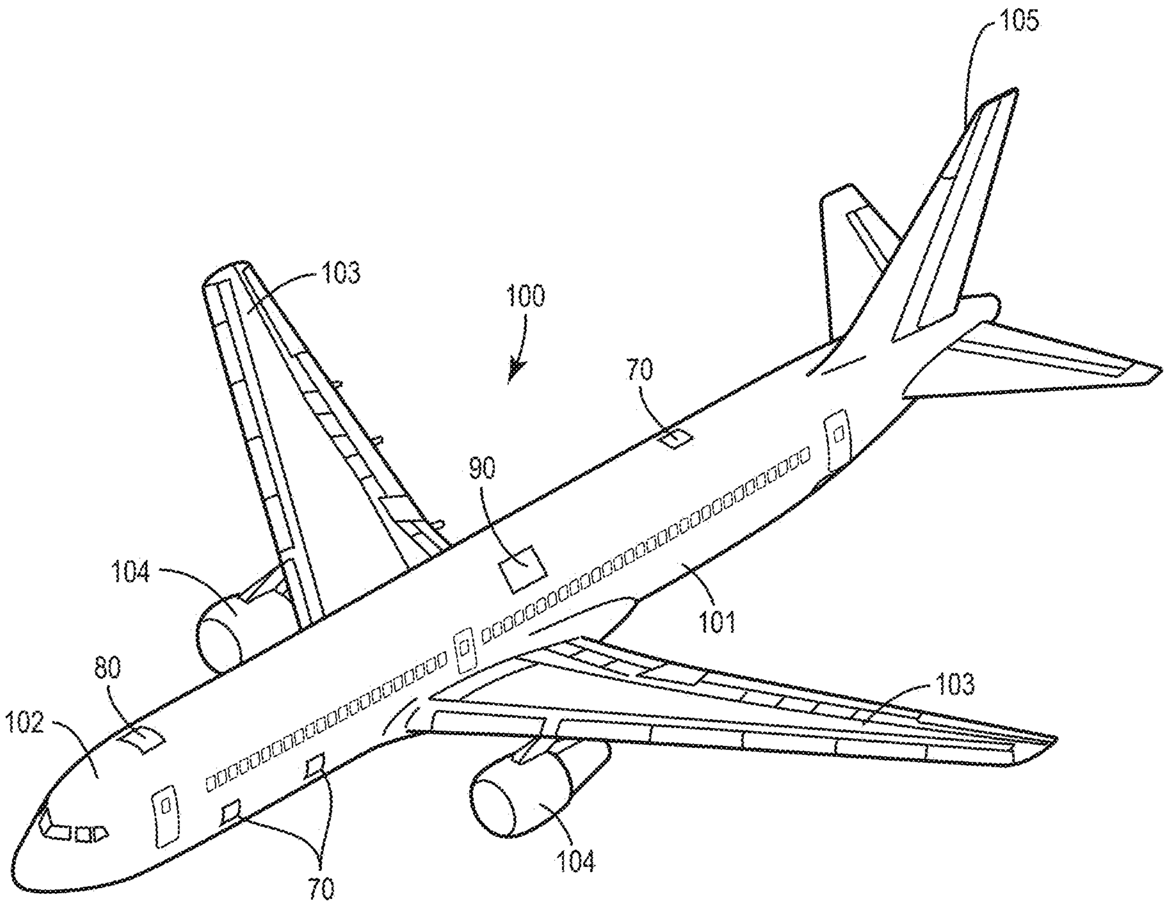
FIG. 2 is an isometric view of an aircraft.

FIG. 2 illustrates an aircraft 100 that generally includes a fuselage 101 configured to accommodate passengers and/or cargo. A flight deck 102 at the front of the fuselage 101 is equipped with controls for flight personnel to operate the aircraft 100. Wings 103 extend outward from the fuselage 101 and include engines 104 to propel the aircraft 100 during flight. A tail section 105 includes horizontal and vertical stabilizers and a rudder.

Sensors 70 are configured to detect one or more characteristics about the aircraft 100 during flight. In some examples, sensors 70 include a total temperature probe and a total pressure probe. The sensors 70 are mounted to detect conditions on the exterior of the aircraft 100. In some examples, the sensors 70 include ports on the exterior of the aircraft 100. The sensors 70 can extend located at different positions, including but not limited to extending outward beyond the skin of the fuselage 101, mounted flush with the skin of the fuselage 101, and mounted to be exposed on the wings 103 or tail section 105.

The aircraft 100 can be equipped with various types of sensors 70 and configured to detect various air data measurements. In some examples, the sensors 70 detect various pressure, temperature, and speed parameters. In some examples, one or more sensors 70 detect a total temperature and one or more sensors 70 detect total pressure. In some examples, the sensors 70 include pitot tubes. Examples of pitot sensors include but are not limited to: a dedicated pitot tube connected to a pressure transducer mounted to the aircraft; a Kiel probe connected to a pressure transducer mounted on an aircraft; a pitot mounted on a mast or boom; a pitot mounted on a swiveling yaw and pitch sensor head (YAPS head); a traditional pneumatic pitot probe connected to a pressure transducer; a traditional pneumatic pitot-static probe connected to a pressure transducer; a traditional pneumatic pitot-static probe connected to a static pressure transducer and a differential pressure transducer that can be summed to compute pitot pressure; a traditional pneumatic air data system and air data computer that can provide total pressure via an electronic signal including a data bus; a traditional pneumatic air data system and air data computer that can provide total pressure; an instrument capable of measuring stagnation pressure.

Some examples of sensors 70 configured to detect temperature include but are not limited to: a total air temperature probe; probe with aspiration; probe that is anti-iced; and a total air temperature probe with a single or multiple temperature sensing elements device configured to measure stagnation temperature. In some examples, a first sensor 70 detects the total temperature and a second sensor 70 detects the total pressure. In various examples, the sensors 70 are independent or combined together.

The LIDAR system 80 is configured to emit laser light outward from the aircraft 100. The LIDAR system 80 includes one or more lasers to emit the laser light and detectors to detect the light that is scattered back towards the aircraft 100. The LIDAR system 80 can be positioned at various locations on the aircraft 100, including at various positions along the fuselage 101, wings 103, and tail section 105.

In some examples, the one or more lasers of the LIDAR system 80 are spaced away from the sensors 70 on the exterior of the aircraft 100. In some examples, the lasers are positioned away from the ports of the sensors 70.

Examples of LIDAR systems 80 include but are not limited to: a LIDAR system designed to measure true airspeed and vector direction using backscatter from airborne aerosols; a LIDAR system designed to measure true airspeed and vector direction using molecular backscatter; a LIDAR system with orthogonal beams emanating from a collocated source to resolve true airspeed and vector direction; a LIDAR system with non-orthogonal beam emanating from a collocated source to resolve true airspeed and vector direction; a LIDAR system using one or more sweeping or switched beams to resolve true airspeed and vector direction; a LIDAR system with beams located at distributed locations around the vehicle to measure the true airspeed vector. In some examples, the LIDAR system is configured to make three or more unique measurements that allows definition of the true airspeed vector.

The control unit 90 receives signals from the sensors 70 and LIDAR system 80. The control unit 90 is configured to use the sensed data to calculate one or more air data measurements. In some examples, the calculations include using data from the LIDAR system 80 which is augmented by a total pressure and total temperature data from the sensors 70 to calculate one or more air data parameters. In some examples, the calculations determine at least pressure altitude, calibrated airspeed, Mach number, and equivalent airspeed.

The control unit 90 uses data from the total temperature sensor 70 and total pressure sensor 70 to augment the LIDAR measurements. The control unit 90 calculates highly-accurate air measurement data that requires minimal a priori flight testing. An advantage of the present system is the total pressure and total temperature measurements are largely independent of placement or flight condition within a reasonable angle-of-attack and sideslip range. This is an improvement over static pressure measurements which are highly dependent on aircraft configuration and flight conditions and static temperature measurements which are largely impractical in flight. This enables the aircraft system 15 to be used as a reliable measurement source in a flight test program without the need to conduct extensive calibrations. Further, the aircraft system 15 can be used on different types of aircraft 100.

Examples of control units 90 include but are not limited to: a dedicated electronic computing system; a piece of software hosted on the avionics system or on the flight control system of the aircraft; an air data computer; a digital cockpit display; and a stand-alone device that is remote from the aircraft 100.

Figure 3:
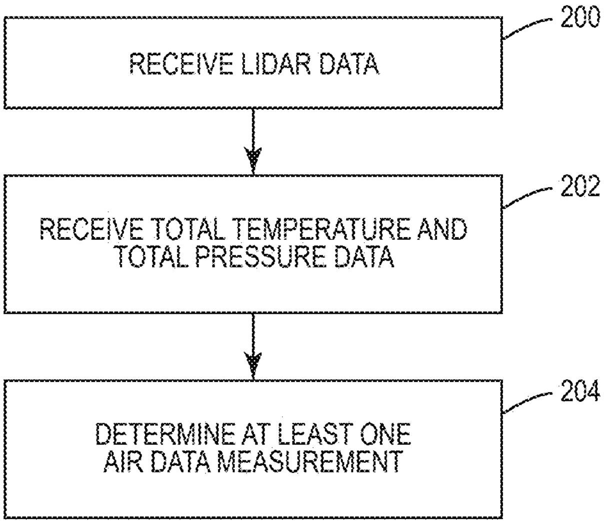
FIG. 3 is a flowchart diagram of a method of determining air data parameters of an aircraft.

FIG. 3 illustrates a method of determining at least one air data measurements. The LIDAR information is received from the LIDAR system 80 (block 200). The total temperature and total pressure are received from the sensors 70 (block 202). The control unit 90 then determines at least one air data measurements (block 204).

In some examples, the LIDAR system 80 is configured to independently determine (i.e., without data from the sensors 70) the true airspeed. The true airspeed is the actual speed of an aircraft relative to the airmass in which the aircraft is flying. The aircraft system 100 uses the LIDAR data in combination with the sensor data to determine at least static temperature, static pressure, pressure altitude, calibrated airspeed, Mach number, dynamic pressure, and equivalent airspeed. The pressure altitude is the altitude in [the] standard atmosphere corresponding to a static pressure. The calibrated airspeed is the speed of the aircraft as identified by sensor systems onboard the aircraft. Calibrated airspeed differs from true airspeed in that calibrated airspeed is uncorrected for the effects of the compressibility and density of the air surrounding the aircraft at the time of measurement. The Mach number is the ratio of the speed of a body to the speed of sound in the surrounding medium. The equivalent airspeed is the true airspeed scaled by the density ratio at altitude that is associated with a specified value of the dynamic pressure.

Figure 4:
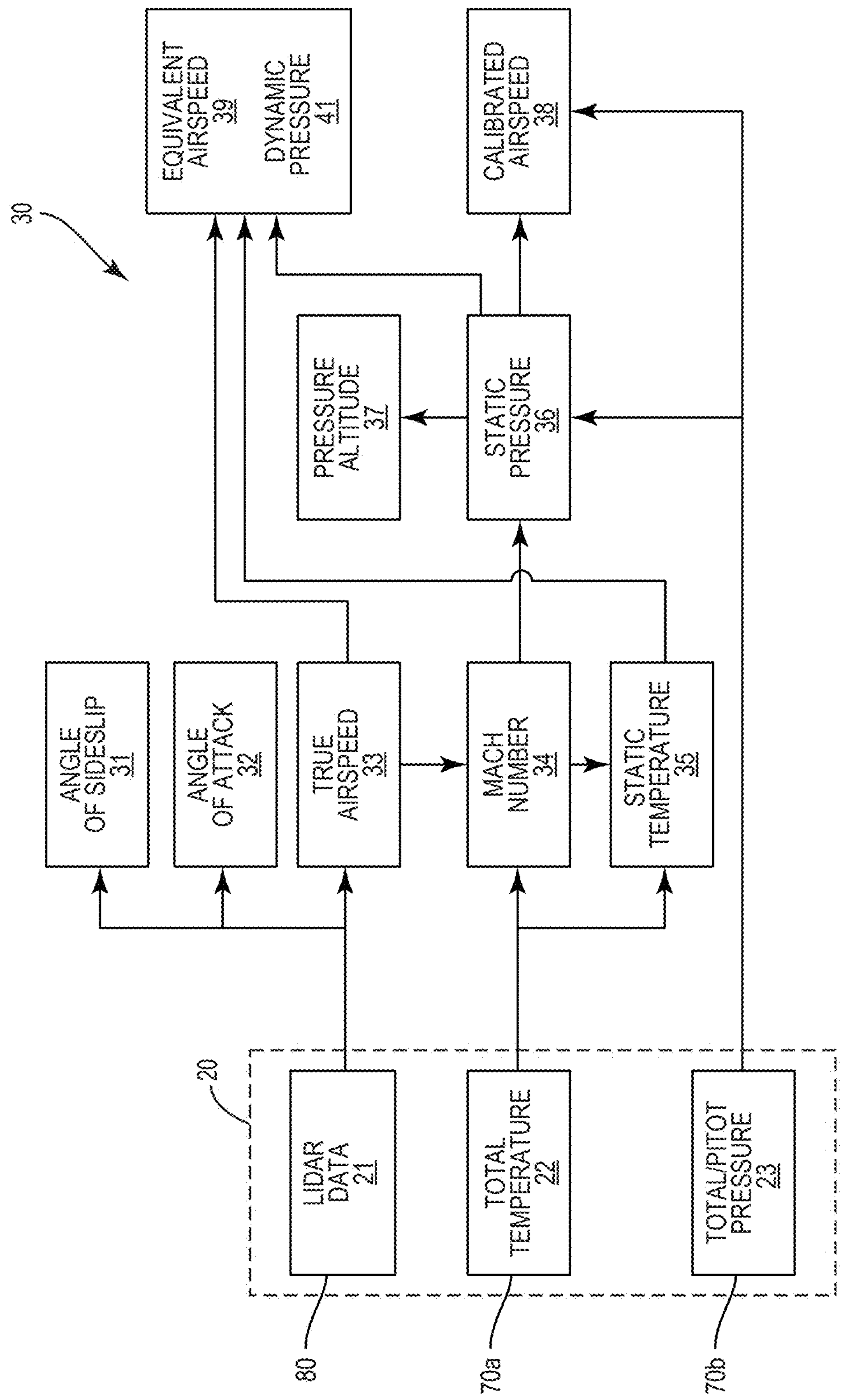
FIG. 4 is a schematic diagram of inputs and outputs of an aircraft system.

FIG. 4 illustrates the functionality of the control unit 90 in calculating air data measurements of the aircraft 100. Inputs 20 are received from the various equipment onboard the aircraft 100. The inputs 20 include LIDAR data 21 received from the LIDAR system 80. The LIDAR data includes line of sight velocity data. Inputs 20 also include total temperature 22 received from a first sensor 70*a*, and total pressure 23 received from a second sensor 70*b*. In some examples, the inputs 20 include the raw data from one or more of the LIDAR systems 80 and sensors 70. In other examples, one or more of the inputs 20 are processed data. In one example, the LIDAR system 80 is configured to process the data and forward the processed data to the control unit 90.

The outputs 30 are determined based on one or more of the inputs 20. The control unit 90 uses the LIDAR data 21 to calculate the angle of sideslip 31 and the angle of attack 32 of the aircraft 100. The true airspeed 33 is also determined based on the LIDAR data.

The Mach number 34 is calculated based on the total temperature 22 received from sensor 70*a* and also on the true airspeed 33. Static temperature 35 is calculated from the Mach number and total temperature 22. Static pressure 36 is calculated based on the Mach number 34 and total pressure received from sensor 70*b*. The pressure altitude 37 is calculated based on the static pressure 36. Calibrated airspeed 38 is calculated based on the static pressure 36 and the total pressure 23 from sensor 70*b*. The equivalent airspeed 39 is calculated based on the true airspeed 33, the static temperature 35, and the static pressure 36. The dynamic pressure 41 is calculated from the true airspeed 33, the static temperature 35, and the static pressure 36.

Figure 5:
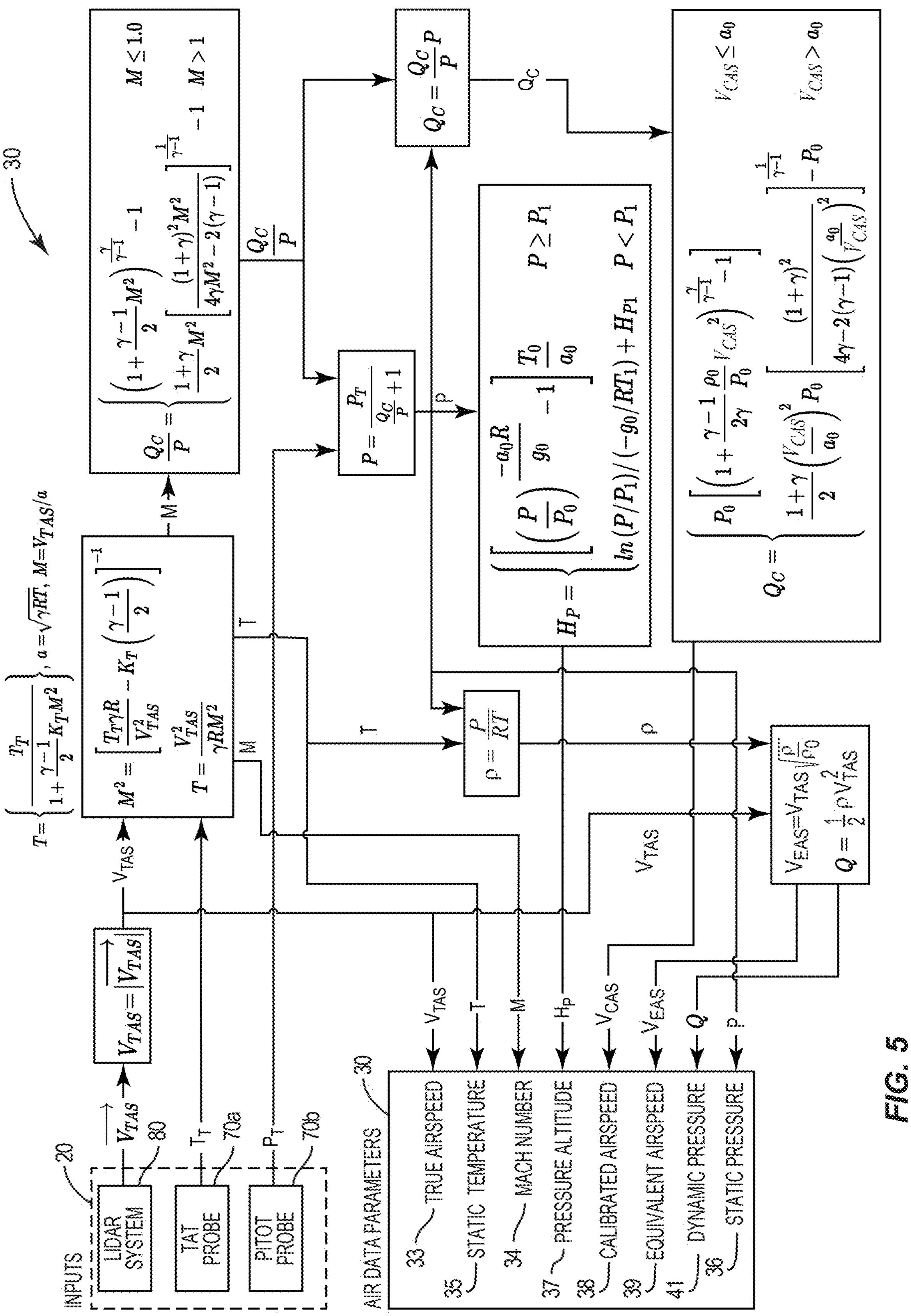
FIG. 5 is a schematic diagram of calculations for determining air data measurements.

FIG. 5 illustrates the processing calculations performed by the control unit 90 to determine various air data measurements. The calculations are based on inputs 20 that include a vector true airspeed ($\overrightarrow{V_{TAS}}$) from the LIDAR data 21, a total temperature $T_T$ from a temperature sensor 70*a*, and a total pressure $P_T$ from a pressure sensor 70*b*. The calculations include the following parameters:

$\gamma$—Ratio of specific heats
$\rho$—Density
$\rho_0$—Sea level standard density
a—Speed of sound
$a_0$—Troposphere lapse rate
$g_0$—Sea level acceleration due to gravity
$H_P$—Pressure altitude
$H_{P1}$—Tropopause pressure altitude
$K_T$—Temperature recovery factor
M—Mach number
P—Static pressure
$P_T$—Total pressure $P_0$—Sea level standard pressure
$P_1$—Tropopause pressure
Q—Dynamic pressure
$Q_C$—Impact pressure
R—Gas constant
T—Static air Temperature
$T_T$—Total air temperature
$T_0$—Sea level standard temperature
$T_1$—Tropopause temperature
$V_{CAS}$—Calibrated airspeed
$V_{EAS}$—Equivalent airspeed
$V_{TAS}$—True airspeed (scalar)
$\overrightarrow{V_{TAS}}$—True airspeed (vector)

A scalar true airspeed 33 ($V_{TAS}$) is based on the vector true airspeed $\overrightarrow{V_{TAS}}$ from the LIDAR data. The Mach number (M) 34 and static air temperature (T) 35 are calculated based on the scalar true airspeed $V_{TAS}$ 33 and the total air temperature ($T_T$) from the temperature sensor 70*a*.

The calculated Mach number (M) 34 is used to determine an impact pressure per static pressure ($Q_C$/P). The impact pressure per static pressure ($Q_C$/P) and the total pressure ($P_T$) are used to determine the static pressure (P). The impact pressure per static pressure ($Q_C$/P) and the static pressure (P) are used to calculate the impact pressure ($Q_C$).

The static pressure P is used to determine the pressure altitude ($H_P$).

The impact pressure QC is a function of the calibrated airspeed $V_{CAS}$. For the subsonic equation ($V_{CAS}<a_0$), the equation is rearranged and solved explicitly. For the supersonic equation ($V_{CAS}>a_0$), the equation is not solved explicitly for $V_{CAS}$ and is solved iteratively or with a numerical method to arrive at $V_{CAS}$ that satisfies the equation.

The density (ρ) is determined using the static pressure (P), gas constant (R), and static air temperature (T). The equivalent airspeed ($V_{EAS}$) 39 is determined based on the true airspeed ($V_{TAS}$), the density (ρ), and sea level standard density ($\rho_0$). The dynamic pressure (Q) 41 is based on the density (ρ) and the true airspeed ($V_{TAS}$).

In some examples, the control unit 90 calculates multiple ones of the air data measurements (e.g., at least pressure altitude 37, calibrated airspeed 38, Mach number 34, and equivalent airspeed 39). In other examples, the control unit 90 calculates just one of these air data measurements.

Figure 6:
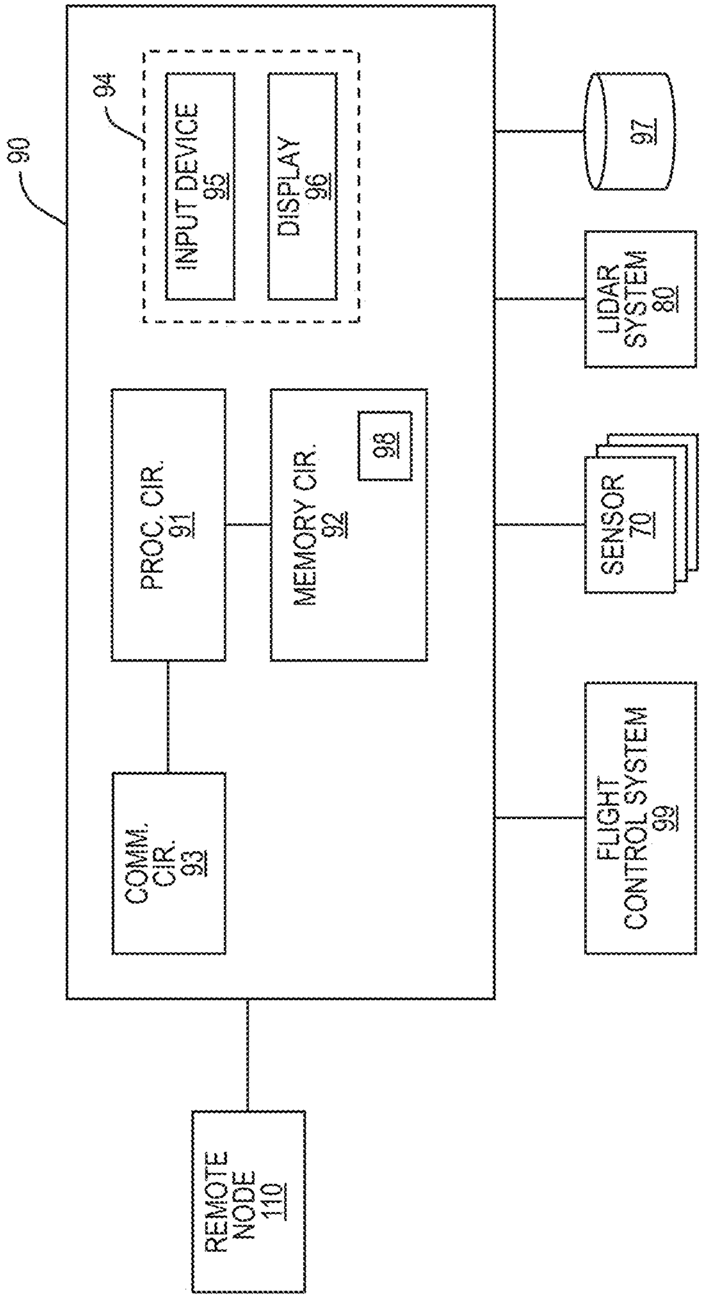
FIG. 6 is a schematic diagram of a control unit.

FIG. 6 illustrates a control unit 90 configured to determine the one or more air data measurements. The control unit 90 includes processing circuitry 91 and memory circuitry 92. The processing circuitry 91 controls the overall operation according to program instructions 98 stored in the memory circuitry 92. The processing circuitry 91 includes one or more circuits, microcontrollers, microprocessors, hardware, or a combination thereof. Memory circuitry 92 includes a non-transitory computer readable storage medium storing program instructions 98, such as a computer program product, that configures the processing circuitry 91 to implement one or more of the techniques discussed herein. Memory circuitry 92 can include various memory devices such as, for example, read-only memory, and flash memory. Memory circuitry 92 can be a separate component as illustrated in FIG. 9 or can be incorporated with the processing circuitry 91. Alternatively, the processing circuitry 91 can omit the memory circuitry 92, e.g., according to at least some embodiments in which the processing circuitry 91 is dedicated and non-programmable.

Communications circuitry 93 is configured to receive signals from the sensors 70 and LIDAR system 80. In some examples, the communications circuitry 93 provides for one-way communication in which the data is received. In other examples, the communications circuitry 93 provides for two-way communication which enables prompting the sensors 70 and/or LIDAR system 80 for data.

The communications circuitry 93 is also configured to communicate with other components onboard the aircraft 100. Examples include but are not limited to a flight control system 99 that oversees operation of the aircraft 100 and an engine control system that oversees operation of the engines 104. The communications circuitry 93 is also configured to communicate with one or more remote nodes 110. The remote nodes 110 are away from the aircraft 100 such as but not limited to a land-based airline, airport, and federal agency.

A user interface 94 provides for flight personnel on the aircraft 100 to access the information. The user interface 94 can include one or more input devices 95 and displays 96. In some examples, the information at the control unit 90 is stored in a database 97. The database 97 can be separate from the control unit 90 as illustrated in FIG. 5 or can be incorporated with the control unit 90. In some examples, the database 97 is remote from the aircraft 100, such as a ground-based server.

In some examples, the control unit 90 is incorporated into one or more other systems within the aircraft 100. In some examples, the control unit 90 is incorporated within a larger control system. In some examples, the control unit 90 is incorporated into the flight control system 99. In some examples, the control unit 90 is located remote (i.e., off-board) from the aircraft 100. The aircraft 100 is configured to communicate the data from the sensors 70 and LIDAR system 80 to the remote control unit 90.

In some examples, the control unit 90 determines one or more of the air data measurements at regular intervals. In other examples, the air data measurements are determined after an event, such as but not limited to a change in course, ascending above a predetermined elevation, and exceeding a given airspeed.

Figure 7:
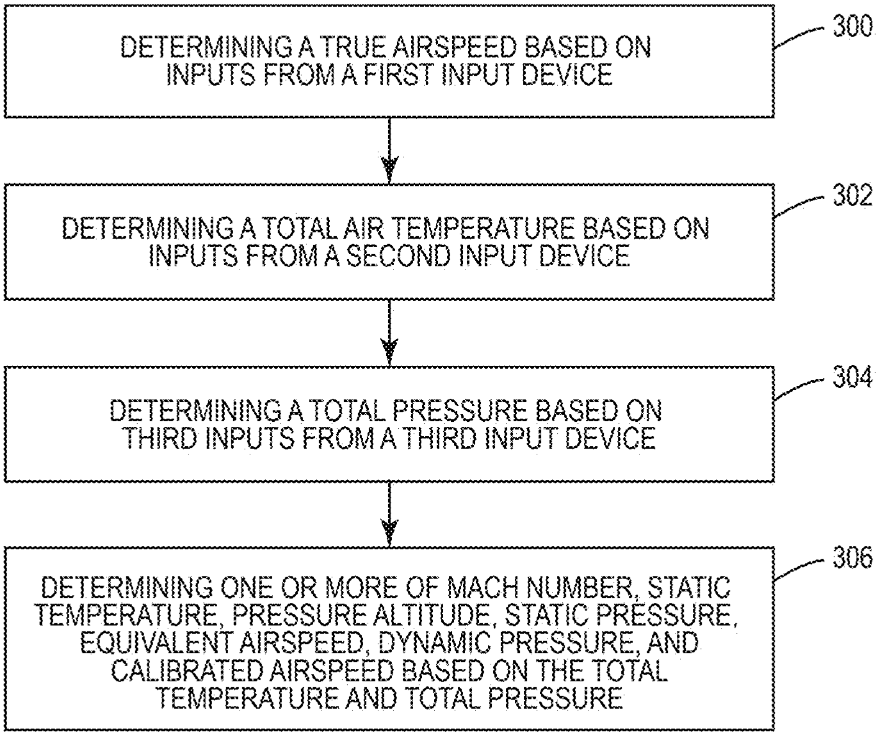
FIG. 7 is a flowchart diagram of a method of determining air data parameters during a flight of an aircraft.

FIG. 7 illustrates a method of determining a pressure altitude and a calibrated airspeed during a flight of an aircraft 100. The method includes determining a true airspeed of the aircraft based on first inputs from a first input device (block 300). A total air temperature is determined based on second inputs from a second input device (block 302). A total pressure is determined based on third inputs from a third input device (block 304). The method also includes determining one or more of pressure altitude, calibrated airspeed, Mach number, static temperature, static pressure, equivalent airspeed, and dynamic pressure based on the true airspeed, the total air temperature, and the total pressure (block 306).

The aircraft system 15 can be used in a variety of different contexts. One application is on an aircraft 100 used to transport passengers and/or cargo as illustrated in FIG. 1. Other uses include:

- as a flight test instrument to provide reference air data;
- as a production air data system to feed data to the flight deck, flight control system, avionics system, weapons system and/or other systems on the aircraft that use the air measurement data;
- as a standby system that provides data to the flight controls, flight personnel in the event of the failure of the primary production air data systems;
- as a supplement to the production air data systems to provide an independent source of data for redundancy management purposed and/or provide air data under flight conditions where traditional air data system are unable to provide reliable data (e.g., extremely high angle-of-attack flight, rearward flight, etc.);

as an air data system independently or in conjunction with other air data systems in other conceivable aircraft architecture where air data is required; and in aircraft to provide redundant systems.

The aircraft system 15 can be used on a variety of aircraft 100. Examples include but are not limited to: commercial or private aircraft configured to transport passengers and/or cargo; piloted aircraft; military tactical aircraft, unmanned aerial vehicles (UAV); remotely piloted aircraft; rotary wing aircraft; jet engine aircraft; turbine engine aircraft; gliders; helicopters; rotorcraft; tiltrotor; tiltwing; missiles or munitions; rockets; air-dropped packages, bodies or engineered devices; spacecraft; subsonic vehicles; transonic vehicles; supersonic vehicles; unmanned air system (UAS) systems; and hypersonic vehicles.

The aircraft system 15 can be used for a variety of purposes and contexts. Examples include but are not limited to:

yield real-time, high quality air data truth source data for a fixed wing flight test program. This data can be used for analysis purpose, for monitoring the aircraft flight condition relative to established limits, or as a truth source for calibrating conventional pneumatic air data systems;

provide primary air data measurements to the flight deck 102, flight control system, and avionics system(s) in lieu of traditional pneumatic air data systems;

provide data that can be telemetered to a ground station in order to compute real-time air data parameters for fixed wing, rotary wing, or UAV/UAS flight test vehicles;

obtaining air data measurements that can be processed post-test to provide high-quality air data parameters for fixed wing, rotary wing, or UAV/UAS flight test program;

provide redundant air data measurements to an aircraft system;

the use of multiple total pressure sensors to provide redundant air data measurements, or to provide reliable total pressure data over a larger range of angles-of-attack and sideslip;

the use of multiple total temperature sensors to provide redundant air data measurements, or to provide reliable total temperature data over a larger range of angles-of-attack and sideslip;

the use alternate sources of temperature data for the algorithm in lieu of, or in addition to, the total temperature probe (e.g., Keil probes and engine inlet sensors);

the use of alternate sources of total pressure data for the algorithm in lieu of, or in addition to, the total pressure probe (e.g., trailing bomb devices);

to augment the electronic algorithm that computes the raw air data parameters from the LIDAR, total pressure, and total temperature, with additional electronic filtering to make the signals more suitable for pilot displays or aircraft control systems; and to augment the air data measurements with additional data sources such as aircraft inertial data and global navigation satellite system data (e.g., global navigation satellite systems such as GPS, GLONASS, Galileo, and BeiDou).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An aircraft system comprising:

a LIDAR system configured to sense first air data measurements;

one or more sensors configured to sense second air data measurements; and a control unit comprising processing circuitry configured to determine:

a true airspeed based on just the first air data measurements;

a total pressure and a total temperature based on just the second air data measurements;

a Mach number based on the total temperature and the true airspeed;

a static temperature based on the Mach number and the total temperature;

a static pressure based on the Mach number and the total pressure;

a pressure altitude based on the static pressure;

a calibrated airspeed based on the static pressure and the total pressure;

an equivalent airspeed based on the true airspeed, the static temperature, and the static pressure; and a dynamic pressure based on the true airspeed, the static temperature, and the static pressure.

2. The aircraft system of claim 1, where the control unit is further configured to calculate an angle of sideslip of the aircraft and an angle of attack of the aircraft based on the first air data measurements from the LIDAR system.

3. The aircraft system of claim 1, wherein the control unit is further configured to cause one or more of the air data parameters to be displayed on a display onboard the aircraft.

4. The aircraft system of claim 1, wherein the one or more sensors comprise a first sensor configured to detect the total pressure and a second sensor configured to detect the total temperature wherein the first sensor and the second sensor are independent.

5. The aircraft system of claim 1, wherein the control unit is incorporated within a flight control system configured to control an operation of the aircraft during the flight.

6. The aircraft system of claim 1, wherein the LIDAR system includes a laser that emits laser light and the one or more sensors comprise static pressure ports on an exterior surface of the aircraft and wherein the laser and the ports are spaced apart on the exterior of the aircraft.

7. The aircraft system of claim 1, wherein the control unit is configured to determine the pressure altitude and the calibrated airspeed at regular intervals during the flight.

8. The aircraft system of claim 1, wherein the LIDAR system and the one or more sensors are configured to simultaneously detect the air data measurements during the flight.

9. The aircraft system of claim 1, wherein each of the one or more sensors, the LIDAR system, and the control unit are onboard the aircraft.

10. The aircraft system of claim 1, wherein the control unit is remote from the aircraft and configured to receive the air data measurements from the aircraft during the flight.

11. The aircraft system of claim 1, wherein the control unit is further configured to determine an impact pressure per static pressure.

12. The aircraft system of claim 1, wherein the control unit is further configured to determine a density based on the static pressure, a gas constant, and the static temperature.

13. The aircraft system of claim 1, further comprising a user interface to enable flight personnel to access calculations of the control unit.

14. The aircraft system of claim 1, wherein the control unit is incorporated into a flight control system of an aircraft that houses the aircraft system.

15. A non-transitory computer readable medium comprising instructions stored thereon that, when executed by processing circuitry of a control unit, configures the control unit to:

receive from sensors air data comprising a total pressure and a total temperature of an aircraft during a flight;

receive air data measurements from a LIDAR system during the flight; and calculate a true airspeed based on just the air data measurements from the LIDAR system;

calculate a total pressure and a total temperature based on just the air data from the sensors;

calculate a Mach number based on the total temperature and the true airspeed;

calculate a static temperature based on the Mach number and the total temperature;

calculate a static pressure based on the Mach number and the total pressure;

calculate a pressure altitude based on the static pressure;

calculate a calibrated airspeed based on the static pressure and the total pressure;

calculate an equivalent airspeed based on the true airspeed, the static temperature, and the static pressure; and calculate a dynamic pressure based on the true airspeed, the static temperature, and the static pressure.

16. The computer readable medium of claim 15, wherein the control unit is further configured to cause the pressure altitude and the calibrated airspeed to be displayed on a display onboard the aircraft.

17. The computer readable medium of claim 15, wherein the control unit is configured to receive the total pressure from a first sensor and the total temperature from a second sensor.

18. The computer readable medium of claim 15, wherein the control unit is configured to display one or more of the static temperature, static pressure, pressure altitude, calibrated airspeed, Mach number, dynamic pressure, and equivalent airspeed on a display in the aircraft.

19. The computer readable medium of claim 15, wherein the control unit is further configured to determine an angle of sideslip, an angle of attack, and a true airspeed based on the air data measurements from the LIDAR system.

20. The computer readable medium of claim 15, wherein the control unit is configured to determine a true airspeed of the aircraft based on just the air data measurements from the LIDAR system and not the total pressure or the total temperature.

* * * * *